United States Patent
Damola

(10) Patent No.: US 10,028,164 B2
(45) Date of Patent: Jul. 17, 2018

(54) METHODS AND DEVICES FOR CONTROLLED DATA UPLOAD IN MOBILE CELLULAR NETWORKS

(75) Inventor: Ayodele Damola, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 104 days.

(21) Appl. No.: 14/422,965

(22) PCT Filed: Sep. 5, 2012

(86) PCT No.: PCT/IB2012/054587
§ 371 (c)(1),
(2), (4) Date: Feb. 20, 2015

(87) PCT Pub. No.: WO2014/037762
PCT Pub. Date: Mar. 13, 2014

(65) Prior Publication Data
US 2015/0230124 A1 Aug. 13, 2015

(51) Int. Cl.
*H04W 28/02* (2009.01)
*H04L 29/08* (2006.01)
(Continued)

(52) U.S. Cl.
CPC ......... *H04W 28/0247* (2013.01); *H04L 67/06* (2013.01); *H04L 67/32* (2013.01);
(Continued)

(58) Field of Classification Search
None
See application file for complete search history.

(56) References Cited

U.S. PATENT DOCUMENTS 6,317,430 B1 11/2001 Knisely et al.
7,095,519 B1 * 8/2006 Stewart .................. G06F 3/1209
358/1.13
(Continued)

FOREIGN PATENT DOCUMENTS

CN 1859124 11/2006
CN 101013906 A 8/2007
(Continued)

OTHER PUBLICATIONS

International Search Report issued in corresponding International application No. PCT/IB2012/054587, dated May 21, 2013.
(Continued)

*Primary Examiner* — Steven H Nguyen
(74) *Attorney, Agent, or Firm* — Patent Portfolio Builders PLLC

(57) ABSTRACT

Methods, devices and software enable uploading a file from a user equipment to an Internet storage service server via a mobile cellular network. A method includes (A) uploading sequential chunks of the file from the user equipment via a cell of the mobile cellular network, (B) sending a first message requesting to pause the uploading, to the user equipment upon receiving an indication that the cell is overloaded, (C) storing a length corresponding to the sequential chunks that have been uploaded until the uploading has been paused, and (D) sending a second message requesting to resume the uploading, to the user equipment. The user equipment pauses the uploading upon receiving the first message and resumes the uploading using an offset from the beginning of the file corresponding to the length upon receiving the second message.

33 Claims, 9 Drawing Sheets

(51) Int. Cl.
*H04W 4/00* (2018.01)
*H04W 28/10* (2009.01)

(52) U.S. Cl.
CPC ............ *H04W 4/00* (2013.01); *H04W 28/02* (2013.01); *H04W 28/10* (2013.01)

(56) References Cited

U.S. PATENT DOCUMENTS

| | | | | |
|---|---|---|---|---|
| 7,406,248 | B1* | 7/2008 | Rao | H04N 5/765 348/E7.071 |
| 8,098,581 | B2 | 1/2012 | Tiedemann, Jr. | |
| 8,375,124 | B1* | 2/2013 | Schwartz | H04L 67/06 370/473 |
| 8,605,578 | B1* | 12/2013 | Govindaraju | H04L 1/1838 370/229 |
| 2004/0057075 | A1* | 3/2004 | Stewart | H04L 29/08846 358/1.15 |
| 2004/0117459 | A1* | 6/2004 | Fry | H04M 3/5307 709/219 |
| 2005/0209927 | A1* | 9/2005 | Aaltonen | G06Q 30/0601 705/26.1 |
| 2006/0129631 | A1 | 6/2006 | Na et al. | |
| 2007/0055862 | A1* | 3/2007 | Sharma | H04L 63/0464 713/150 |
| 2010/0121941 | A1* | 5/2010 | Harrang | H04L 12/00 709/219 |
| 2010/0151851 | A1* | 6/2010 | Bhatia | H04L 67/06 455/425 |
| 2010/0228845 | A1* | 9/2010 | Choi | H04W 36/385 709/223 |
| 2010/0232293 | A1 | 9/2010 | Sagfors et al. | |
| 2010/0238861 | A1* | 9/2010 | Kitahara | H04W 72/1231 370/328 |
| 2011/0176482 | A1* | 7/2011 | Vizor | H04L 47/781 370/328 |

FOREIGN PATENT DOCUMENTS

| | | |
|---|---|---|
| EP | 1 569 409 A2 | 8/2005 |
| WO | 2013/093653 A1 | 6/2013 |

OTHER PUBLICATIONS

Written Opinion of the International Searching Authority issued in corresponding International application No. PCT/IB2012/054587, dated May 21, 2013.

Katica, Naida et al., "Opportunities for Telecom Operators in Cloud Computing Business," 2012 Proceedings of the IEEE 35th International Convention (MIPRO), May 21, 2012, pp. 495-500, XP032201964, ISBN 978-1-4673-2577-6.

3GPP, "3rd Generation Partnership Project; Technical Specification Group Services and System Aspects; Packet-Switched Streaming Service (PSS) Improved Support for Dynamic Adaptive Streaming over HTTP in 3GPP; (Release 11)," 3GPP TR 26.938, Mobile Competence Centre; 650, Route des Lucioles, F-06921 Sophia-Antipolis Cedex, France, vol. SA WG4, No. V0.3.0, Aug. 20, 2012, pp. 1-26, XP050649031.

Fielding, R., "Request for Comments: 2616," Standards Track, Hypertext Transfer Protocol—HTTP/1.1, Jun. 1999.

Office Action in corresponding European Application No. 12 770 251.2 dated Jul. 12, 2017.

R. Malhotra, et al.; "Modeling the interaction of IEEE 802.3x hop-by-hop flow control and TCP end-to-end flow control"; Next Generation Internet Networks, XP010798902; Apr. 18-20, 2005; pp. 260-267; Rome, Italy.

Search Report in corresponding Chinese Application No. 2012800763789 dated Oct. 31, 2017.

* cited by examiner

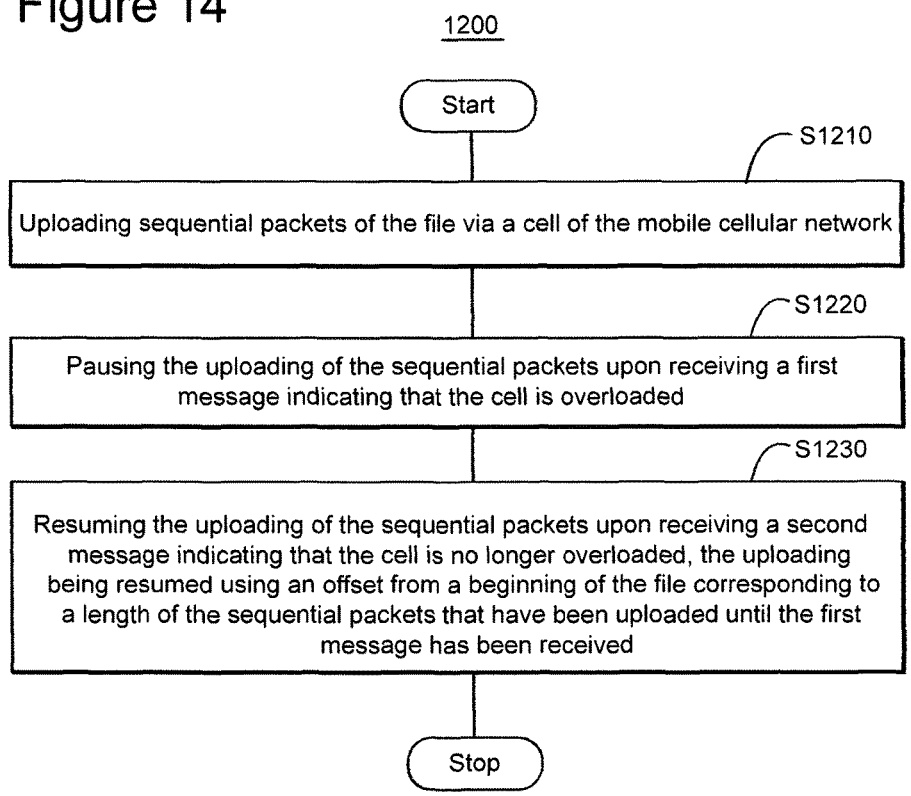

METHODS AND DEVICES FOR CONTROLLED DATA UPLOAD IN MOBILE CELLULAR NETWORKS

TECHNICAL FIELD

The present invention generally relates to methods and devices for controlled data upload over mobile cellular networks, and, in particular, to methods and devices providing a cloud-based uploading service configured to pause uploading while the mobile cellular network's load is high.

BACKGROUND

In the context of the rapid increase of smartphone usage, a new kind of traffic designed to enhance users' experience is synchronizing content related to the same user account on different devices. For example, Apple iCloud is a service for the delivery and storage of content to and from Apple terminals (iPhones, iPads, MacBooks, etc.), synchronizing content across several terminals registered under the same Apple ID. If a new content item occurs or an existing content item is changed in one of these terminals, the new or modified content item is copied to all other devices operating under the same Apple ID. Apple iCloud may be used to synchronize content items produced by Apple applications/services (collectively named "features") such as Photo Stream, Data & Documents, Contacts, Calendars, Reminders, Bookmarks and Notes. For example, the Photo Stream service allows an end user to take pictures using his iPhone or iPad, which are then uploaded via the iCloud to the other devices (e.g., MacBook) belonging to that user.

In order to accomplish this type of inter-device synchronization, as illustrated in FIG. 1, Apple uses Akamai's Global Management Service (for global server load balancing to ensure high availability and responsiveness to user requests) and an Internet storage service server such as a Microsoft cloud storage service Azure. The transfer of files from an iDevice 10 to the Internet storage service server 50 is typically performed via Wi-Fi (servers 20, 30 and 40 and commands exchanged there-between to accomplish this transfer are illustrated in FIG. 1), but may potentially be performed also via a cellular network.

The transfer of large files such as photos over the cellular network to synchronize content on different devices may cause or worsen congestion in the cellular network's air interface. However since conventionally the network operator cannot control an ongoing synchronization to avoid it causing or adding to the cellular network's overload, such a transfer may have a negative impact on the network's performance.

Nevertheless, from the cellular network operator's perspective, delivering iCloud upload sync traffic is a profit opportunity from either end users or Apple. Accordingly, it would be desirable to provide devices, systems and methods for delivering upload sync content over cellular networks without negative impact on the network's performance.

SUMMARY

Some embodiments of the present inventive concept use information about the load of a mobile cellular network to control the upload of a file from user equipment to an Internet storage service server. When the network load is below a predefined threshold, the upload is allowed to proceed, but when the network load threshold is been exceeded, the upload session is temporarily suspended until the load decreases. Pause/resume features are implemented in the context of existing technology for optimizing content delivery over mobile cellular networks (e.g., the hardware and software combination operating as a mobile cloud accelerator). The protocol typically used to carry upload data to Internet storage service servers, HTTP, being a stateless protocol, pause/resume operations have to be initiated by a server maintaining a state related to the uploading.

According to one exemplary embodiment, a method for uploading a file from a user equipment to an Internet storage service server using a mobile cellular network includes uploading sequential chunks of the file from the user equipment via a cell of the mobile cellular network. The method further includes, upon receiving an indication that the cell is overloaded, sending a first message requesting to pause the uploading to the user equipment, wherein, upon receiving the first message, the user equipment pauses the uploading of the sequential chunks. The method then includes storing a length corresponding to the sequential chunks that have been uploaded until the uploading has been paused. The method also includes, upon receiving an indication that the cell is no longer overloaded, sending a second message requesting to resume the uploading, to the user equipment. Upon receiving the second message, the user equipment resumes the uploading of the sequential chunks of the file using an offset from the beginning of the file corresponding to the length.

According to another exemplary embodiment, a server for uploading a file from a user equipment to an Internet storage service server via a mobile cellular network includes an interface configured to enable communication via the mobile cellular network and a data processing unit. The data processing unit is connected to the interface and is configured (A) to send a first message to the user equipment uploading sequential packets of the file via a cell of the mobile cellular network if an indication that the cell is overloaded has been received via the interface, and (B) to send a second message to the user equipment if an indication that the cell is no longer overloaded has been received via the interface. The first message requests the user equipment to pause uploading of sequential packets of the file. The first message and the second message are sent using the interface. Upon receiving the first message, the user equipment pauses the uploading, and, upon receiving the second message, the user equipment resumes the uploading using an offset from the beginning of the file corresponding to a length of the sequential packets that have been uploaded until the uploading has been paused.

According to another exemplary embodiment, there is a method for uploading a file from a user equipment to an Internet storage service server, the method being executed by a server operating in a mobile cellular network. The method includes sending a first message to the user equipment if an indication that a cell where the user equipment is located is overloaded has been received. The first message requests the user equipment to pause the uploading of sequential packets via the mobile cellular network. The method further includes sending a second message to the user equipment if an indication that the cell is no longer overloaded has been received. Upon receiving the second message, the user equipment resumes the uploading of the sequential packets of the file using an offset from the beginning of the file corresponding to a length of the sequential packets that have been uploaded until the uploading has been paused.

According to another exemplary embodiment, a computer-readable storage medium non-transitorily stores executable codes which, when executed on a computer capable of communicating via a mobile cellular network, make the computer perform a method for uploading a file from a user equipment to an Internet storage service server. The method includes sending a first message to the user equipment if an indication that a cell where the user equipment is located is overloaded has been received. The first message requests the user equipment to pause the uploading of sequential packets via the mobile cellular network. The method further includes sending a second message to the user equipment if an indication that the cell is no longer overloaded has been received. Upon receiving the second message, the user equipment resumes the uploading of the sequential packets of the file using an offset from the beginning of the file corresponding to a length of the sequential packets that have been uploaded until the uploading has been paused.

According to yet another embodiment, a user equipment in a mobile cellular network uploading a file from the user equipment to an Internet storage service server includes an interface configured to enable communication via the mobile cellular network and a data processing unit. The data processing unit is connected to the interface and is configured (A) to upload sequential packets of the file via a cell of the mobile cellular network, (B) to pause uploading the sequential packets upon receiving a first message indicating that the cell is overloaded, and (C) to resume uploading the sequential packets upon receiving a second message indicating that the cell is no longer overloaded. The uploading is resumed using an offset from the beginning of the file corresponding to a length of the sequential packets that have been uploaded until the first message has been received.

According to another embodiment, there is a method for uploading a file from a user equipment to an Internet storage service server using a mobile cellular network, the method being executed by the user equipment. The method includes uploading sequential packets of the file via a cell of the mobile cellular network, pausing the uploading of the sequential packets upon receiving a first message indicating that the cell is overloaded, and resuming the uploading of the sequential packets upon receiving a second message indicating that the cell is no longer overloaded. The uploading is resumed using an offset from the beginning of the file corresponding to a length of the sequential packets that have been uploaded until the first message has been received.

According to another exemplary embodiment, a computer-readable storage medium non-transitorily stores executable codes which, when executed on a computer capable of communicating via a mobile cellular network, make the computer perform a method for uploading a file from the computer to an Internet storage service server. The method includes uploading sequential packets of the file via a cell of the mobile cellular network, pausing the uploading of the sequential packets upon receiving a first message indicating that the cell is overloaded, and resuming the uploading of the sequential packets upon receiving a second message indicating that the cell is no longer overloaded. The uploading is resumed using an offset from the beginning of the file corresponding to a length of the sequential packets that have been uploaded until the first message has been received.

It is an object to provide devices and methods for uploading files to an Internet storage service server using a cellular network without overwhelming the mobile cellular network due to this additional traffic.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 14 is a flowchart of a method performed by a user equipment for uploading a file from the user equipment to an Internet storage service server using a mobile cellular network according to an exemplary embodiment.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a mobile cellular network.

Reference throughout the specification to "one embodiment" or "an embodiment" means that a particular feature, structure or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

Figure 2:
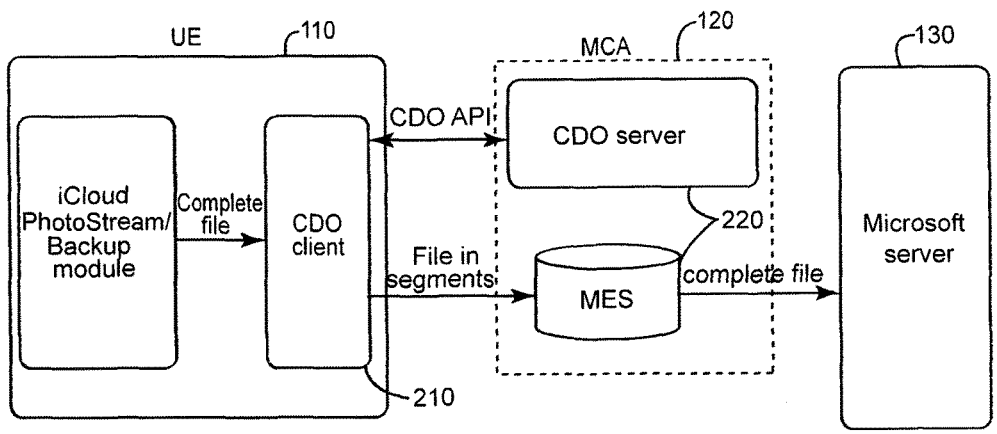
FIG. 2 is a schematic diagram of a cellular network system according to one exemplary embodiment.

According to an exemplary embodiment illustrated in FIG. 2, a file is uploaded from a user equipment (UE) 110 to an Internet storage service server 130 (e.g., a Microsoft server) using a mobile cellular network 120. In the UE 110, an application or service such as Photo Stream may make the file available to a content delivery optimization (CDO) client process 210 running on one of the processors therein. The UE 110 is configured to exchange data wirelessly with components of the core of the network operator. In particular, the UE 110 may communicate with components of a mobile cloud accelerator (MCA) that optimizes mobile cellular network 120 use.

In the embodiment illustrated in FIG. 2, the UE 110 uploads the file chunk by chunk to a mobile edge server (MES). The MES, which is part of the MCA, operates as an intermediate storage server. Meanwhile, a content delivery optimization (CDO) server process is executed by a processor of a device in the MCA. The CDO server is connected to the CDO client 210 via a CDO application interface (API). After all the chunks of the file have been uploaded to the MES, the MES transfers the complete file to the Internet storage service server 130.

Figure 3:
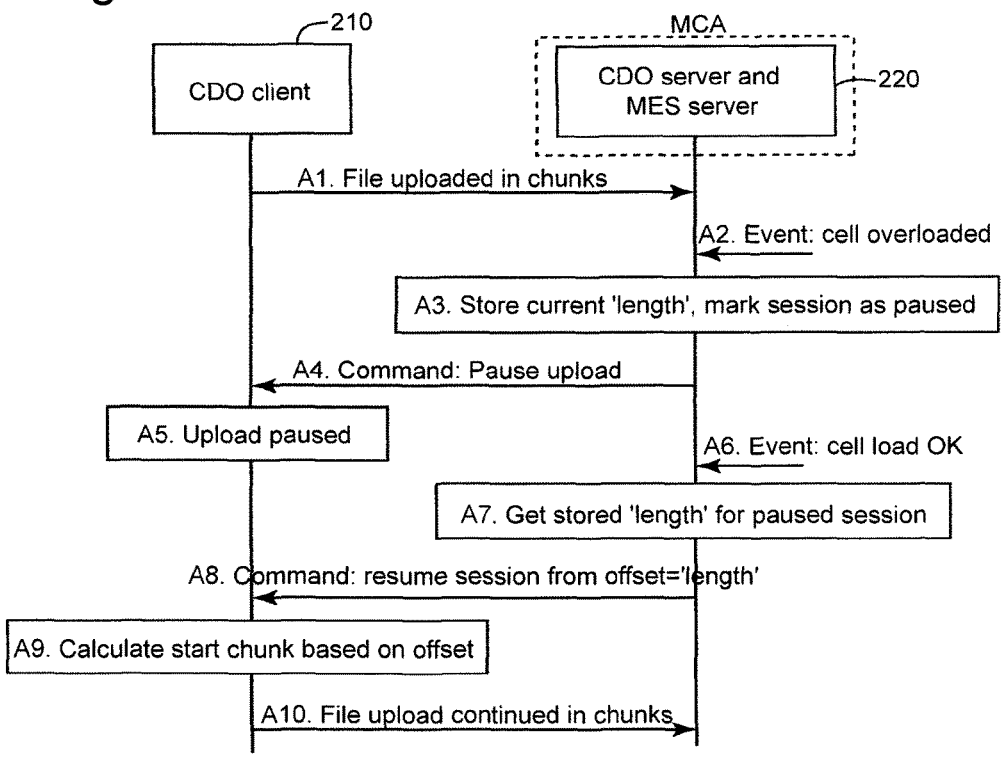
FIG. 3 is a data flow diagram that illustrates uploading a file from a user equipment to an Internet storage service server using a mobile cellular network according to an exemplary embodiment.

Data flow during uploading a file from the UE 110 to the Internet storage service server is explained in more detail in FIG. 3 as an interaction between the CDO client 210 and the CDO server and MES server 220. The steps A1 to A10 are arranged from top to bottom in FIG. 3 approximately in the order in which they occur.

At step A1, the CDO client 210 uploads chunks of the file to the MES server. At step A2, the CDO server receives a notice indicating that the cell of the mobile cellular network where UE 110 is located is overloaded. Then, at step A3, the length of the already-uploaded chunks is stored in view of the upcoming interruption in the uploading. At step A4, the CDO server sends a first message to the CDO client 210 to pause the uploading. Upon receiving the first message, the CDO client 210 pauses the uploading at step A5.

After receiving a notice indicating that the cell of the mobile cellular network where UE 110 is located is no longer overloaded (i.e., cell load is OK) at step A6, the CDO server retrieves the stored length at step A7 and sends a second message that includes the length to the CDO client 210 and commands the uploading be resumed at step A8. At step A9, the CDO client 210 calculates an offset from the beginning of the file from which to continue uploading the chunks, and continues uploading the file at step A10.

Figure 4:
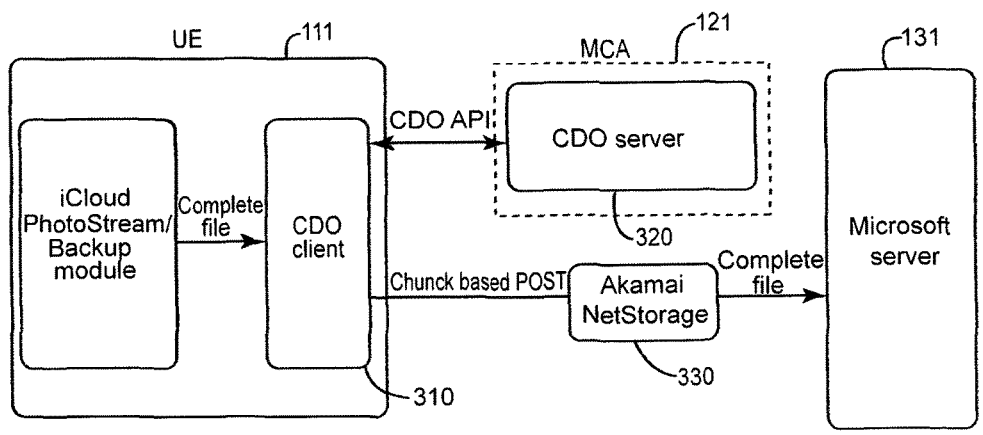
FIG. 4 is a schematic diagram of a mobile cellular network system according to another exemplary embodiment.

FIG. 4 illustrates a cellular network system according to another exemplary embodiment, the system being configured to upload a file from a user equipment (UE) 111 to an Internet storage service server 131 (e.g., a Microsoft server) using a mobile cellular network 121. Here, an Akamai NetStorage server 330 is used as an intermediate storage server.

As previously discussed relative to FIG. 2, in the UE 111, an application or service such as Photo Stream may make the file available to a content delivery optimization (CDO) client process 310 running on one of the processors therein. The UE 111 is configured to be able to exchange data wirelessly with components of the core of the network operator. In particular, the UE 111 may communicate with components of a mobile cloud accelerator (MCA) that optimizes mobile cellular network 121 use.

The UE 111 uploads the file chunk by chunk to the Akamai NetStorage server 330. The chunk-by-chunk manner of transfer may be implemented, for example, using the POST method defined in HTTP 1.1. The POST procedure that enables the intermediate storage server to track the length is illustrated by the following pseudo-code:

```
length := 0
    read chunk-size, chunk-extension (if any) and CRLF
    while (chunk-size > 0) {
        read chunk-data and CRLF
        append chunk-data to entity-body
        length := length + chunk-size
        read chunk-size and CRLF
    }
    read entity-header
    while (entity-header not empty) {
        append entity-header to existing header fields
        read entity-header
    }
    Content-Length := length
    Remove "chunked" from Transfer-Encoding
```

Meanwhile, a content delivery optimization (CDO) server process 320 is executed by a processor of a device in the MCA. The CDO server 320 is connected to the CDO client 310 via a CDO application interface (API). After all chunks of the file have been uploaded to the Akamai NetStorage server 330, the Akamai NetStorage server 330 transfers the complete file to the Internet storage service server 131.

Figure 5:
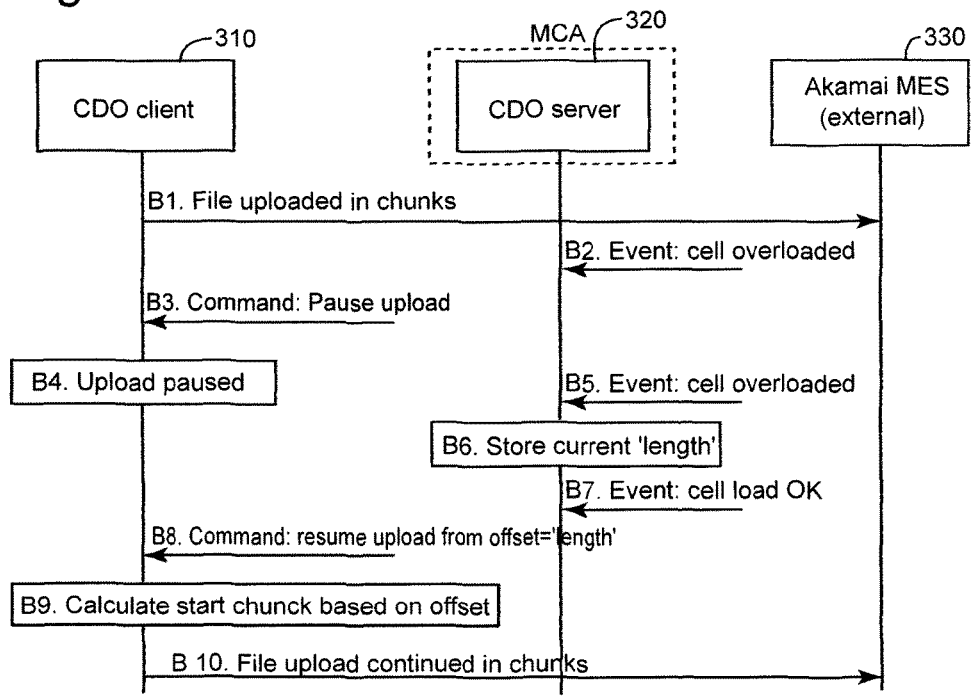
FIG. 5 is a data flow diagram that illustrates uploading a file from a user equipment to an Internet storage service server using a mobile cellular network according to another exemplary embodiment.

Data flow during uploading a file from the UE 111 to the Internet storage service server is explained in more detail in FIG. 5 as an interaction between the CDO client 310 and the CDO server 320 and the Akamai NetStorage server 330. Steps B1 to B10 are arranged from top to bottom in FIG. 5 approximately in the order in which they occur.

At step B1, the CDO client 310 uploads chunks of the file to the Akamai NetStorage server 330 using the mobile cellular network. At step B2, the CDO server 320 receives a notice indicating that the cell of the mobile cellular network where UE 111 is located is overloaded. Then, at step B3, the CDO server 320 sends a first message to the CDO client 310 to pause the upload. Upon receiving the command, the CDO client 310 pauses the uploading at B4. The length of the already-uploaded chunks is retrieved by the CDO server 320 at step B5 and stored at B6.

After receiving a notice indicating that the cell of the mobile cellular network where UE 111 is located is no longer overloaded (i.e., cell load is OK) at step B7, the CDO server 320 sends a second message that includes the length to the CDO client 310 and commands the uploading be resumed. At step B9, the CDO client 310 calculates an offset from the beginning of the file from which to continue uploading the chunks, and continues uploading the file at step B10.

Figure 6:
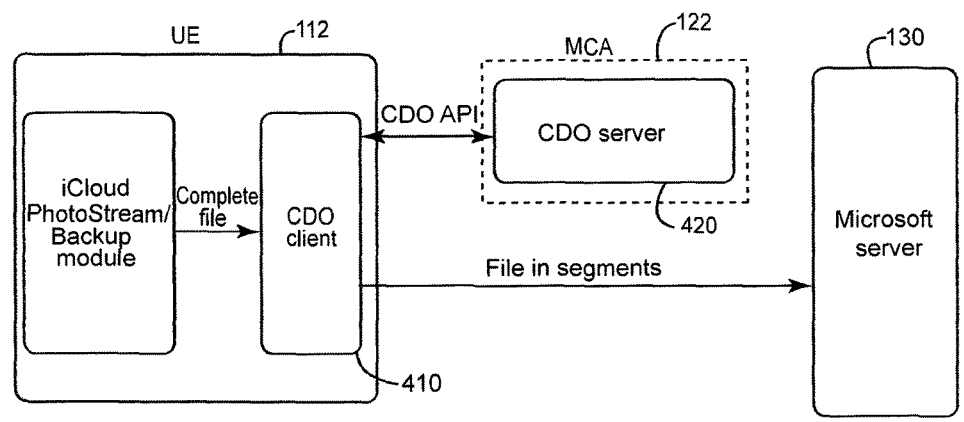
FIG. 6 is a schematic diagram of a mobile cellular network system according to another exemplary embodiment.

In the embodiment illustrated in FIG. 6, the UE 112 uploads segments of the file directly to the Internet storage service (Microsoft) server 130 using the mobile cellular network 122 to pick up the segments from the CDO client 410. A content delivery optimization (CDO) server process 420 is executed by a processor of a device in the MCA of the mobile cellular network. The CDO server 420 is connected to the CDO client 410 via a CDO application interface (API).

Figure 7:
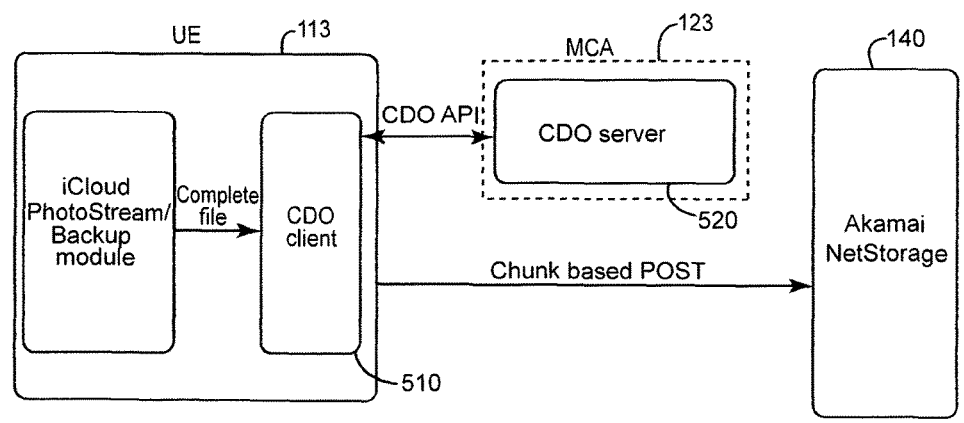
FIG. 7 is a schematic diagram of a mobile cellular network system according to another exemplary embodiment.

Yet in another embodiment illustrated in FIG. 7, the UE 113 uploads the file chunk by chunk (e.g., using POST) to the Akamai NetStorage server 140 using the mobile cellular network 123 to pick up the chunks from the CDO client 510. A content delivery optimization (CDO) server process 520 is executed by a processor of a device in the MCA of the mobile cellular network. The CDO server 520 is connected to the CDO client 510 via a CDO application interface (API).

As previously discussed relative to FIGS. 2 and 4, in the UE 112 or 113, an application or service such as Photo Stream may make the file available to a content delivery optimization (CDO) client process 410 or 510 running on one of the processors therein. The UE 112 or 113 is configured to exchange data wirelessly with components of the core of the network operator. In particular, the UE 112 or 113 may communicate with components of a mobile cloud accelerator (MCA) that optimizes use of the mobile cellular network 122 or 123.

Figure 8:
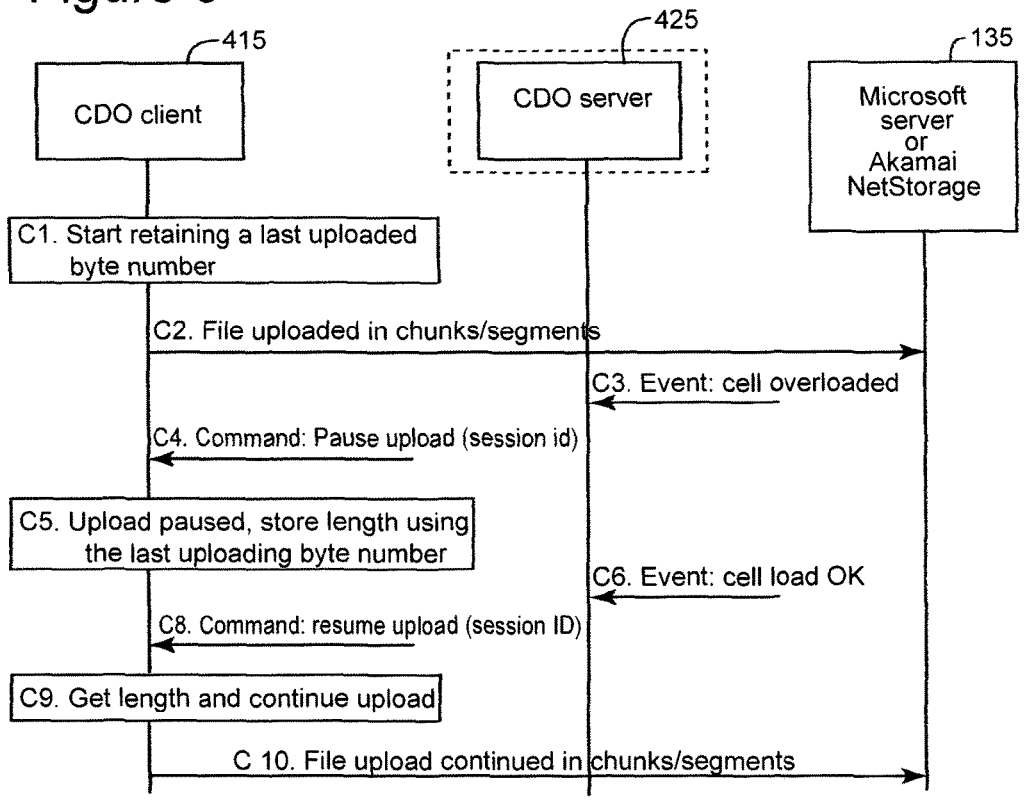
FIG. 8 is a data flow diagram that illustrates uploading a file from a user equipment to an Internet storage service server using a mobile cellular network according to another exemplary embodiment.

Data flow during uploading a file from UE 112 or UE 113 to the Microsoft server 130 or the Akamai NetStorage server 140 is explained in more detail in FIG. 8 as an interaction between the CDO client 415 (i.e., 410 or 510), the CDO server 425 (i.e., 420 or 520) and the Microsoft server or the Akamai NetStorage server 135. Steps C1 to 010 are arranged from top to bottom in FIG. 8 approximately in the order in which they occur.

At step C1, the CDO client 415 starts tracking offset from the beginning of the file. At step C2, the CDO client 415 uploads the file to the server 135 chunk by chunk or in segments. At step C3, the CDO server 425 receives a notice indicating that the cell of the mobile cellular network where UE 112 or 113 is located is overloaded. Then, at step C4, the CDO server 425 sends a first message to the CDO client 415 to pause the upload. The first message includes a session ID.

Upon receiving the first message, the CDO client 415 pauses the uploading and stores the offset corresponding to the chunks or segments already uploaded in association with the session ID, at step C5.

After receiving a notice indicating that the cell of the mobile cellular network where UE 112 or UE 113 is located is no longer overloaded (i.e., cell load is OK) at step C6, the CDO server 425 sends a second message that includes the session ID to the CDO client 415 and commands the uploading be resumed at step C8. At step C9, the CDO client 415 retrieves the stored offset based on the session ID and continues uploading the file at step C10.

In the embodiments in FIGS. 2, 4, 6 and 7, as part of the MCA, the CDO server may receive the indication that the cell is overloaded and the indication that the cell is no longer overloaded from a module of the MCA that monitors traffic in the mobile cellular network.

Figure 1:
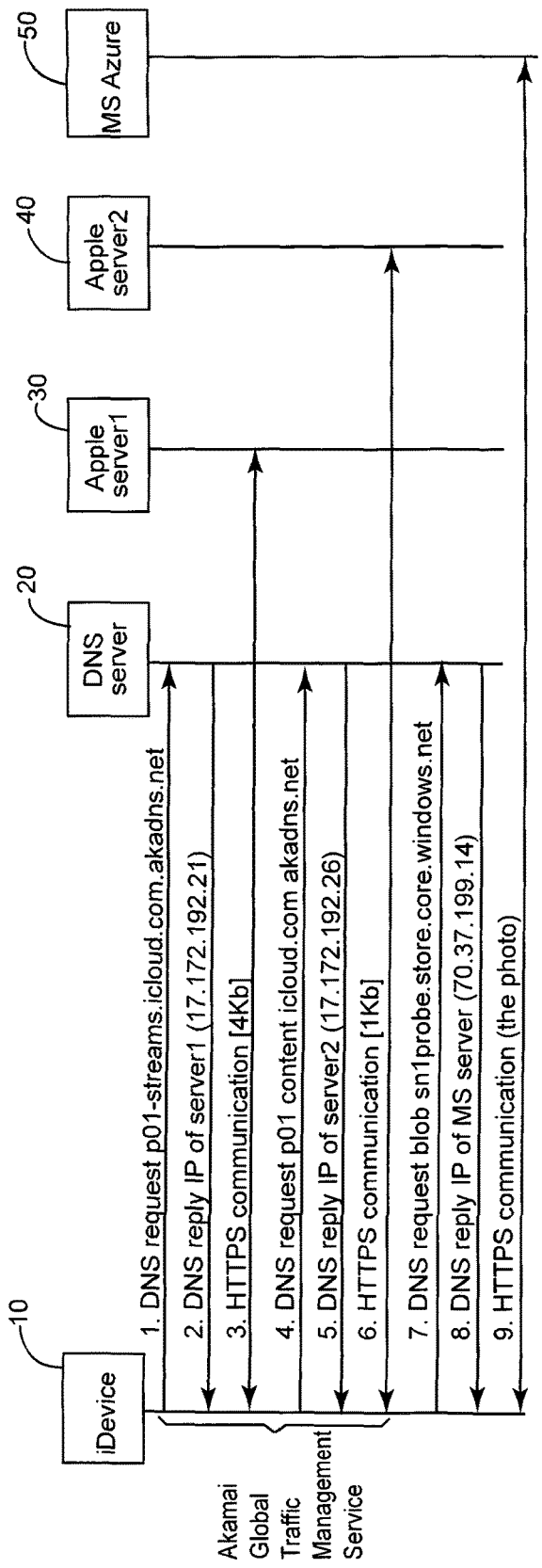
FIG. 1 illustrates a conventional method for uploading a file from an iDevice to an Internet storage device via a WiFi network.
Figure 9:
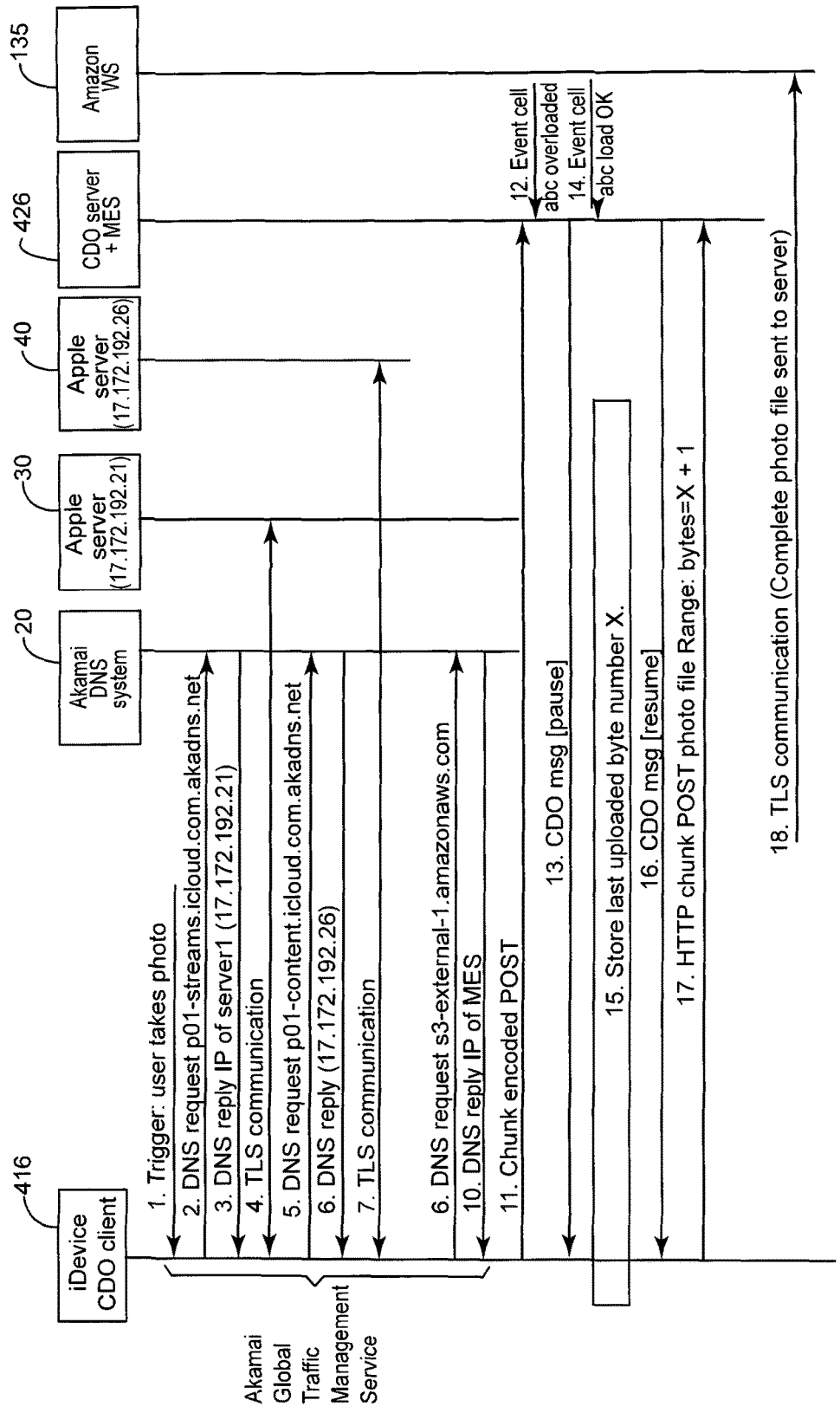
FIG. 9 illustrates a method for uploading a file from an iDevice to an Internet storage device via a mobile cellular network according to an exemplary embodiment.

FIG. 9 illustrates a file transfer to synchronize content of related iDevices via a cellular network according to an exemplary embodiment. The Akamai Global Traffic Management Service (i.e., steps 1-10) operates similar to the conventional implementation illustrated in FIG. 1 (steps 1-6 therein), but using a different protocol, in the context of servers 20, 30, 40 and the user equipment 416. The user equipment 416 is configured to send sequential chunks, via a cellular network at 11. Upon receiving an indication that the cell of the cellular network is overloaded at 12, the CDO server and MES 426 sends a first message to the user equipment 416 to pause the uploading at 13. Upon receiving the first message, the user equipment 416 pauses the uploading and stores the uploaded byte number at 15.

Upon receiving an indication that the cell of the cellular network is no longer overloaded at 14, the CDO server and MES 426 sends a second message to the user equipment 416 to resume the uploading at 16. Upon receiving the second message, the user equipment 416 resumes the uploading using an offset from the beginning of the file corresponding to the length, i.e., next chunk according to the stored byte number, at 17. When the file in its entirety is uploaded in the MES (i.e., an intermediate server), the file is transferred to the Internet storage service server 135 at 18.

Figure 10:
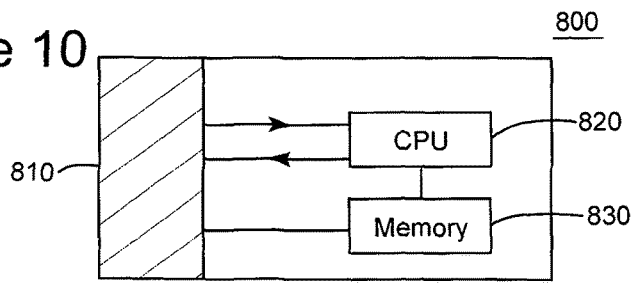
FIG. 10 is a schematic diagram of a server operating in a mobile cellular network according to an exemplary embodiment.

A schematic diagram of a server (e.g., 220, 320, 420, 425, 520) operating in a mobile cellular network to upload a file from a user equipment to an Internet storage service server is illustrated in FIG. 10. The server 800 has an interface 810 configured to enable communication via the mobile cellular network and a data processing unit 820 connected to the interface 810. The server 800 further includes a memory 830 that may store data or executable codes.

The data processing unit 820 is configured to send a first message to the user equipment uploading sequential packets of a file via a cell of the mobile cellular network, the first message requesting the user equipment to pause the uploading, if an indication that the cell is overloaded has been received via the interface. The data processing unit 820 is also configured to send a second message to the user equipment if an indication that the cell is no longer overloaded has been received via the interface to the user equipment. Upon receiving the first message, the user equipment pauses the uploading, and upon receiving the second message, the user equipment resumes the uploading using an offset from the beginning of the file corresponding to a length of the sequential packets that have been uploaded until the uploading has been paused.

The server may be part of a mobile cloud accelerator (MCA) of the mobile cellular network. The data processing unit may be further configured to store the length upon receiving the indication that the cell is overloaded, and to include the length in the second message. Alternatively, the data processing unit may be further configured to include a session identifier in the first message and in the second message, thereby enabling the user equipment to determine the offset.

Figure 11:
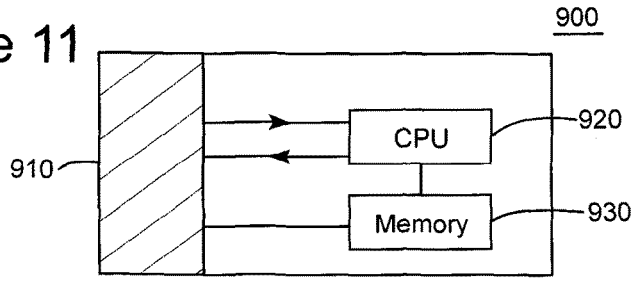
FIG. 11 is a schematic diagram of a user equipment operating in a mobile cellular network according to an exemplary embodiment.

A schematic diagram of a user equipment (e.g., 110, 111, 112, 113) operating in a mobile cellular network to upload a file to an Internet storage service server is illustrated in FIG. 11. The user equipment 900 has an interface 910 configured to enable communication via the mobile cellular network and a data processing unit 920 connected to the interface 910. The user equipment 900 further includes a memory 930 that may store data or executable codes.

The data processing unit 920 is configured (A) to upload sequential packets of the file via a cell of the mobile cellular network and (B) to pause uploading the sequential packets upon receiving a first message indicating that the cell is overloaded. The data processing unit 920 is also configured to resume uploading the sequential packets upon receiving a second message indicating that the cell is no longer overloaded. The uploading is then resumed using an offset from the beginning of the file corresponding to a length of the sequential packets that have been uploaded until the first message has been received.

The length may be included in the second message. Alternatively, the data processing unit may be further configured to store the offset associated with a session identifier included in the first message, and to retrieve the offset based on the session identifier included in the second message.

Figure 12:
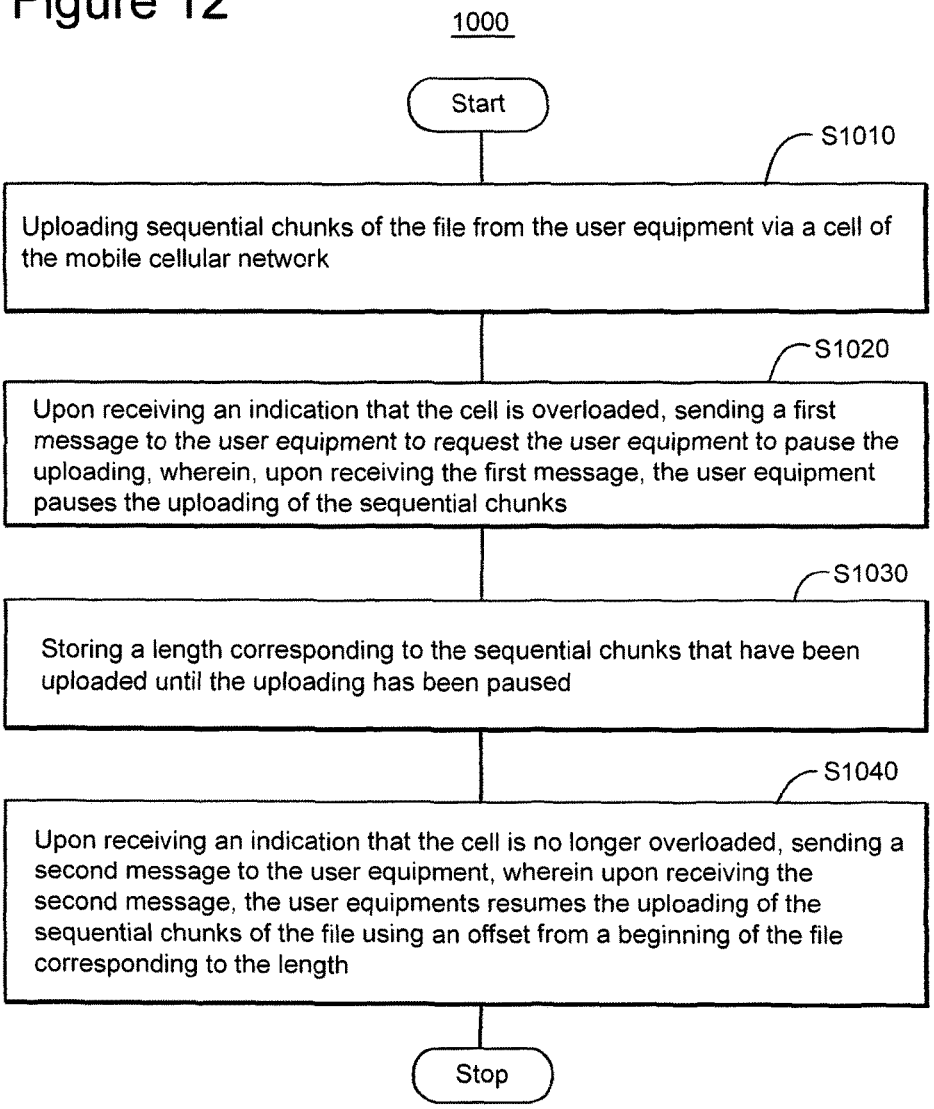
FIG. 12 is a flowchart of a method for uploading a file from a user equipment to an Internet storage service server using a mobile cellular network according to an exemplary embodiment.

FIG. 12 is a flowchart of a method 1000 for uploading a file from a user equipment to an Internet storage service server using a mobile cellular network. The method 1000 includes uploading sequential chunks of the file from the user equipment via a cell of the mobile cellular network at S1010. Method 1000 further includes sending a first message to the user equipment to request it to pause the uploading upon receiving an indication that the cell is overloaded at S1020. Upon receiving the first message, the user equipment pauses the uploading of the sequential chunks.

Method 1000 further includes storing a length corresponding to the sequential chunks that have been uploaded until the uploading has been paused at S1030. Method 1000 then includes sending a second message to the user equipment upon receiving an indication that the cell is no longer overloaded at S1040. Upon receiving the second message, the user equipment resumes the uploading of the sequential chunks of the file using an offset from the beginning of the file corresponding to the length.

Figure 13:
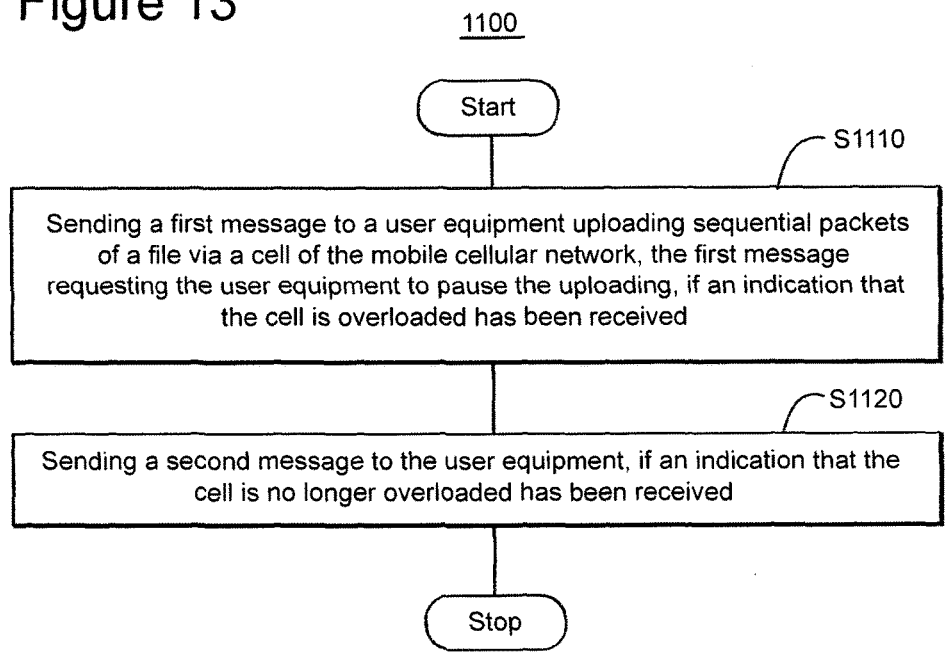
FIG. 13 is a flowchart of a method performed by a server for uploading a file from a user equipment to an Internet storage service server using a mobile cellular network according to an exemplary embodiment.

A flowchart of a method 1100 performed by a server (e.g., 220, 320, 420, 425, 520, 800) for uploading a file from a user equipment (e.g., 110, 111, 112, 113) to an Internet storage service server using a mobile cellular network is illustrated in FIG. 13. Method 1100 includes sending a first message if an indication that a cell where the user equipment is located is overloaded has been received at S1110. The first message requests the user equipment to pause the uploading. Upon receiving the first message, the user equipment pauses the uploading.

Method 1100 further includes sending a second message to the user equipment if an indication that the cell is no longer overloaded has been received at S1120. Upon receiving the second message, the user equipment resumes the uploading of the sequential packets of the file using an offset from the beginning of the file corresponding to a length of the sequential packets that have been uploaded until the uploading has been paused.

The server executing method 1100 may be part of a mobile cloud accelerator (MCA) of the mobile cellular network. When the sequential chunks are first uploaded to an intermediate data server, method 1100 may further include storing the length upon receiving the indication that the cell is overloaded, and including the length in the second message. Alternatively, when the sequential chunks are loaded directly to the Internet storage service server, method 1100 may further include including a session identifier in the first message and in the second message, thereby enabling the user equipment to determine the offset.

The memory 830, which is a computer-readable storage medium non-transitorily storing data, may store executable codes which when executed by the data processing unit 820 make the data processing unit perform method 1100.

FIG. 14 is a flowchart of a method 1200 performed by a user equipment (e.g., 110, 111, 112, 113 or 900) for uploading a file to an Internet storage service server using a mobile cellular network according to an exemplary embodiment. Method 1200 includes uploading sequential packets of the file via a cell of the mobile cellular network at S1210. Method 1200 further includes pausing the uploading of the sequential packets upon receiving a first message indicating that the cell is overloaded at S1220. Method 1200 also includes resuming the uploading of the sequential packets upon receiving a second message indicating that the cell is no longer overloaded. Here the uploading is resumed using an offset from the beginning of the file corresponding to a length of the sequential packets that have been uploaded until the first message has been received.

The length may be included in the second message. Alternatively, the method may further include storing the offset associated with a session identifier included in the first message, and retrieving the offset based on the session identifier included in the second message.

The memory 930, which is a computer-readable storage medium non-transitorily storing data, may store executable codes which when executed by the data processing unit 920 make the data processing unit perform method 1200.

The embodiments set forth above address the issue of enabling upload of larger files via a mobile cellular network without negatively affecting the traffic. From a network operator's perspective, the mobile cellular network is used more efficiently. From an end user's perspective, content (e.g., Photo Stream) can be uploaded over 3G/4G networks that have more coverage than Wi-Fi networks. From the perspective of a provider (i.e., Apple) whose devices may be synchronized, synchronizing is no longer restricted to only Wi-Fi networks.

The disclosed exemplary embodiments provide methods, devices and software for uploading a file from a user equipment to an Internet storage service server via a mobile cellular network, with the uploading being paused (interrupted) while the network is overloaded. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer-readable medium may be utilized, including hard disks, CD-ROMs, digital versatile disc (DVD), optical storage devices, or magnetic storage devices such as a floppy disk or a magnetic tape. Other non-limiting examples of computer-readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a specifically programmed computer or processor.

What is claimed is:

1. A method for uploading a file from a user equipment to an Internet storage service server using a mobile cellular network and a content delivery optimization (CDO) server in order to synchronize content that is related to a same user account on a plurality of user equipments, the method comprising:
    uploading sequential chunks of the file from the user equipment via a cell of the mobile cellular network;
    upon receiving an indication that the cell is overloaded, sending from the CDO server, a first message requesting to pause the uploading, to the user equipment, upon receiving the first message, the user equipment pauses the uploading of the sequential chunks;

storing a length corresponding to the sequential chunks that have been uploaded until the uploading has been paused; and upon receiving an indication that the cell is no longer overloaded, sending from the CDO sever, a second message requesting to resume the uploading, to the user equipment, upon receiving the second message, the user equipment resumes the uploading of the sequential chunks of the file using an offset from a beginning of the file corresponding to the length.

2. The method of claim 1, the user equipment tracks the length of uploaded sequential chunks and stores the length, when the uploading is paused.

3. The method of claim 2, the user equipment tracks the length of uploaded sequential chunks by retaining a last uploaded byte number.

4. The method of claim 1, the sequential chunks are uploaded in an intermediate storage server, the method further comprising:

transmitting the file from the intermediate storage server to the Internet storage service server outside the mobile cellular network, after all the sequential packets of the file have been uploaded in the intermediate storage server.

5. The method of claim 4, the sequential chunks are uploaded in the intermediate storage server using a procedure that enables the intermediate storage server to track the length.

6. The method of claim 4, the intermediate storage server is part of a mobile cloud accelerator (MCA) of the mobile cellular network.

7. The method of claim 4, the intermediate storage server is an external intermediate storage server which is not part of a mobile cloud accelerator (MCA) of the mobile cellular network.

8. The method of claim 1, the content delivery optimization (CDO) server is part of a mobile cloud accelerator (MCA) of the mobile cellular network, and receives the indication that the cell is overloaded and the indication that the cell is no longer overloaded.

9. The method of claim 8, the sequential chunks are uploaded in an intermediate storage server using a procedure that enables the MCA to track the length, the length is stored in the CDO server when the uploading is paused, and the second message includes the length.

10. The method of claim 9, the intermediate storage server is an external intermediate storage server that is not part of the MCA, the CDO server retrieves the length from the intermediate storage server and stores the length when the uploading is paused.

11. The method of claim 8, the CDO server receives the indication that the cell is overloaded and the indication that the cell is no longer overloaded from a module of the MCA that monitors traffic in the mobile cellular network.

12. The method of claim 8, the sequential chunks are uploaded directly in the Internet storage service server, the CDO server includes a session identifier in the first message and in the second message, and the user equipment tracks the length of uploaded sequential chunks and stores the length as the offset from the beginning of the file corresponding to the session identifier, when the uploading is paused.

13. The method of claim 12, the sequential chunks are uploaded in the Internet storage service server using a chunk encoded POST procedure.

14. A content delivery optimization (CDO) server for uploading a file from a user equipment to an Internet storage service server via a mobile cellular network in order to synchronize content that is related to a same user account on a plurality of user equipments, comprising:

an interface configured to enable communication via the mobile cellular network; and a data processing unit connected to the interface and configured to send, from the CDO server, a first message to the user equipment uploading sequential packets of the file via a cell of the mobile cellular network responsive to receiving an indication that the cell is overloaded via the interface, the first message requesting the user equipment to pause uploading of sequential packets of the file, and to send a second message, from the CDO server, to the user equipment if an indication that the cell is no longer overloaded has been received via the interface, the first message and the second message are sent using the interface, and upon receiving the first message, the user equipment pauses the uploading, and, upon receiving the second message, the user equipment resumes the uploading using an offset from a beginning of the file corresponding to a length of the sequential packets that have been uploaded until the uploading has been paused.

15. The CDO server of claim 14, the CDO server is part of a mobile cloud accelerator of the mobile cellular network.

16. The CDO server of claim 14, the data processing unit is further configured to store the length upon receiving the indication that the cell is overloaded, and to include the length in the second message.

17. The CDO server of claim 14, the data processing unit is further configured to include a session identifier in the first message and in the second message, thereby enabling the user equipment to store the length associated with the session identifier upon receiving the first message and to retrieve the length based on the session identifier upon receiving the second message, to determine the offset.

18. A method for uploading a file from a user equipment to an Internet storage service server in order to synchronize content that is related to a same user account on a plurality of user equipments, the method being executed by a content delivery optimization (CDO) server operating in a mobile cellular network, the method comprising:

sending, from the CDO server, a first message to the user equipment, responsive to receiving an indication that a cell where the user equipment is located is overloaded, the first message requesting the user equipment to pause the uploading of sequential packets via the mobile cellular network; and sending, from the CDO server, a second message to the user equipment, responsive to receiving an indication that the cell is no longer overloaded, upon receiving the first message, the user equipment pauses the uploading, and, upon receiving the second message, the user equipment resumes the uploading of the sequential packets of the file using an offset from a beginning of the file corresponding to a length of the sequential packets that have been uploaded until the uploading has been paused.

19. The method of claim 18, the CDO server is part of a mobile cloud accelerator of the mobile cellular network.

20. The method of claim 18, further comprising:
storing the length upon receiving the indication that the cell is overloaded, and
including the length in the second message.

21. The method of claim 18, further comprising:
including a session identifier in the first message and in the second message, thereby enabling the user equipment to store the length associated with the session identifier upon receiving the first message and to retrieve the length based on the session identifier upon receiving the second message, to determine the offset.

22. A non-transitory computer-readable storage medium storing executable codes which, when executed on a computer that is capable to communicate via a mobile cellular network, make the computer perform a method for uploading a file from a user equipment to an Internet storage service server in order to synchronize content that is related to a same user account on a plurality of user equipments, the method comprising:
sending, from a content delivery optimization (CDO) server, a first message to the user equipment uploading sequential packets of the file via a cell of the mobile cellular network responsive to receiving an indication that the cell is overloaded, the first message requesting the user equipment to pause the uploading; and
sending, from the CDO server, a second message to the user equipment, responsive to receiving an indication that the cell is no longer overloaded,
upon receiving the first message, the user equipment pauses the uploading, and, upon receiving the second message, the user equipment resumes the uploading of the sequential packets of the file using an offset from a beginning of the file corresponding to a length of the sequential packets that have been uploaded until the uploading has been paused.

23. A user equipment in a mobile cellular network uploading a file to an Internet storage service server in order to synchronize content that is related to a same user account on a plurality of user equipments, the user equipment comprising:
an interface configured to enable communication via the mobile cellular network; and
a data processing unit connected to the interface and configured
(A) to upload sequential packets of the file via a cell of the mobile cellular network,
(B) to pause uploading the sequential packets responsive to receiving, from a content delivery optimization (CDO) server, a first message requesting to pause the uploading due to the cell being overloaded, and
(C) to resume uploading the sequential packets upon receiving, from the CDO server, a second message indicating that the cell is no longer overloaded, the uploading being resumed using an offset from a beginning of the file corresponding to a length of the sequential packets that have been uploaded until the first message has been received.

24. The user equipment of claim 23, the data processing unit is further configured to track the length of uploaded sequential chunks and to store the length as the offset from the beginning of the file, when the uploading is paused.

25. The user equipment of claim 24, the data processing unit tracks the length of uploaded sequential chunks by retaining a last uploaded byte number.

26. The user equipment of claim 23, the length is included in the second message.

27. The user equipment of claim 23, the data processing unit is further configured
to store the offset associated with a session identifier included in the first message, and
to retrieve the offset based on the session identifier included in the second message.

28. A method for uploading a file from a user equipment to an Internet storage service server in order to synchronize content that is related to a same user account on a plurality of user equipments, the method being executed by the user equipment in a mobile cellular network, the method comprising:
uploading sequential packets of the file via a cell of the mobile cellular network;
pausing the uploading of the sequential packets responsive to receiving, from a content delivery optimization (CDO) server, a first message requesting to pause the uploading due to the cell being overloaded; and
resuming the uploading of the sequential packets upon receiving, from the CDO server, a second message indicating that the cell is no longer overloaded, the uploading being resumed using an offset from a beginning of the file corresponding to a length of the sequential packets that have been uploaded until the first message has been received.

29. The method of claim 28, further comprising:
tracking the length of uploaded sequential chunks; and
storing the length as the offset from the beginning of the file, when the uploading is paused.

30. The method of claim 29, the length is tracked by retaining a last uploaded byte number.

31. The method of claim 28, the length is included in the second message.

32. The method of claim 28, further comprising:
storing the offset associated with a session identifier included in the first message, and
retrieving the offset based on the session identifier included in the second message.

33. A non-transitory computer-readable storage medium storing executable codes which when executed on a computer that is capable to communicate via a mobile cellular network, make the computer perform a method for uploading a file from the computer to an Internet storage service server in order to synchronize content that is related to a same user account on a plurality of user equipments, the method comprising:
uploading sequential packets of the file via a cell of the mobile cellular network;
pausing the uploading of the sequential packets responsive to receiving, from a content delivery optimization (CDO) server, a first message requesting to pause the uploading due to the cell being overloaded; and
resuming the uploading of the sequential packets upon receiving, from the CDO server, a second message indicating that the cell is no longer overloaded, the uploading being resumed using an offset from a beginning of the file corresponding to a length of the sequential packets that have been uploaded until the first message has been received.

\* \* \* \* \*